(12) United States Patent
Shigeta et al.

(10) Patent No.: US 7,581,612 B2
(45) Date of Patent: Sep. 1, 2009

(54) DRIVE FORCE DISTRIBUTION DEVICE AND METHOD FOR DISTRIBUTING DRIVE FORCE

(75) Inventors: Ryouhei Shigeta, Anjo (JP); Tomoaki Kato, Kariya (JP); Akihiro Ohno, Okazaki (JP); Tsuyoshi Murakami, Handa (JP); Yasushi Yamada, Okazaki (JP); Tadashi Yoshioka, Chiryu (JP); Shunzo Tanaka, Nagoya (JP)

(73) Assignees: JTEKT Corporation, Osaka-shi (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 417 days.

(21) Appl. No.: 11/496,513

(22) Filed: Aug. 1, 2006

(65) Prior Publication Data

US 2007/0029126 A1 Feb. 8, 2007

(30) Foreign Application Priority Data

Aug. 2, 2005 (JP) ............................. 2005-224300

(51) Int. Cl.
*B60K 28/08* (2006.01)
*F16H 59/64* (2006.01)

(52) U.S. Cl. .................. 180/233; 477/98; 477/174; 180/248

(58) Field of Classification Search .................. 180/233, 180/247, 197, 248; 192/3.29; 62/6; 477/98, 477/174, 178; 701/67
See application file for complete search history.

(56) References Cited

U.S. PATENT DOCUMENTS

| | | | |
|---|---|---|---|
| 4,774,910 A * | 10/1988 | Aihara et al. ............. 123/41.12 |
| 5,681,237 A | 10/1997 | Furukawa et al. |
| 5,707,315 A | 1/1998 | Furukawa et al. |
| 5,884,609 A * | 3/1999 | Kawamoto et al. .......... 123/520 |
| 6,086,248 A * | 7/2000 | Paul et al. .................... 374/145 |
| 6,618,666 B2 * | 9/2003 | Amano et al. ................ 701/113 |
| 6,637,565 B2 | 10/2003 | Kwon |
| 6,655,135 B2 * | 12/2003 | Oka .............................. 60/329 |
| 6,752,742 B2 | 6/2004 | Shigeta et al. |
| 6,769,526 B2 * | 8/2004 | Iida et al. .................... 192/82 T |
| 6,980,904 B2 * | 12/2005 | Gosho et al. ................ 701/113 |
| 7,048,084 B2 * | 5/2006 | Shigeta et al. .............. 180/248 |
| 7,054,732 B2 | 5/2006 | Rieger et al. |
| 7,077,783 B2 * | 7/2006 | Senger et al. ................. 477/98 |
| 7,105,936 B2 * | 9/2006 | Kubo .......................... 290/32 |
| 7,329,206 B2 | 2/2008 | Tanaka |

(Continued)

FOREIGN PATENT DOCUMENTS

EP    1 270 305 A2    1/2003

(Continued)

*Primary Examiner*—Tony H. Winner
(74) *Attorney, Agent, or Firm*—Oblon, Spivak, McClelland, Maier & Neustadt, P.C.

(57) ABSTRACT

An IG-off-timer measures the time t_off from when an engine is stopped, or an ignition is turned off. An ECU sequentially memorizes an estimated temperature of each of heat generating portions as a memorized temperature. Immediately after the engine is re-started, the ECU sets an initial value of the estimated temperature of each heat generating portion in such a manner that the initial value reflects a temperature drop of the heat generating portion in the deactivation period of the engine. The temperature of the heat generating portion is thus accurately estimated even after re-starting of the engine. The heat generating portions are thus appropriately protected.

10 Claims, 2 Drawing Sheets

U.S. PATENT DOCUMENTS

| | | |
|---|---|---|
| 2003/0079954 A1 | 5/2003 | Murakami et al. |
| 2007/0029126 A1 | 2/2007 | Shigeta et al. |
| 2007/0032339 A1 * | 2/2007 | Shigeta et al. ................ 477/98 |

FOREIGN PATENT DOCUMENTS

| | | |
|---|---|---|
| EP | 1 308 338 A2 | 5/2003 |
| GB | 2 309 498 | 7/1997 |
| JP | 7-12155 | 1/1995 |
| JP | 2003-136990 | 5/2003 |
| WO | WO 02/04831 A2 | 1/2002 |
| WO | WO 02/25133 A1 | 3/2002 |

* cited by examiner

DRIVE FORCE DISTRIBUTION DEVICE AND METHOD FOR DISTRIBUTING DRIVE FORCE

CROSS-REFERENCE TO RELATED APPLICATIONS

This application is based upon and claims the benefit of priority from prior Japanese Patent Application No. 2005-224300, filed on Aug. 2, 2005, the entire contents of which are incorporated herein by reference.

BACKGROUND OF THE INVENTION

The present invention relates to a drive force distribution device and a method for distributing drive force.

A typical drive force distribution device is capable of changing a drive force distribution ratio of a main drive wheel to a sub drive wheel. Typically, a torque coupling is provided in a drive force transmission system. Operation of the torque coupling is controlled in such a manner as to change the torque transmission rate (the transmitted torque) from an input to an outlet of the torque coupling. This regulates the drive force distribution ratio of the main drive wheel to the sub drive wheel.

The torque coupling employs a friction clutch, which generates heat through frictional engagement of clutch plates. Also, a transfer case or a differential, which are arranged in the drive force transmission system of a vehicle, generate heat through friction caused by engagement of gears. Overheating of these heat generating portions thus must be suppressed.

For example, Japanese Laid-Open Patent Publication No. 2003-136990 describes a drive force distribution device that detects the temperatures of a differential or a transfer case provided in a drive force transmission system. If the temperature of the differential or the transfer case exceeds a corresponding predetermined level, the drive force distribution device controls operation of a torque coupling in such a manner as to suppress overheating of the differential or the transfer case.

However, to deploy a temperature sensor in each of the heat generating portions, an increased cost is needed to prepare, assemble, and wire the necessary parts. Thus, to avoid this problem, Japanese Laid-Open Patent Publication No. 7-12155, for example, describes a method for estimating the temperature of a torque coupling in correspondence with the rotational speeds of an input shaft and an output shaft provided in the torque coupling, and the torque transmission rate. By employing the method, overheating of the heat generating portions is effectively suppressed through a simplified structure.

Specifically, to estimate the temperature of each heat generating portion in correspondence with the rotational speed of the torque coupling and the torque transmission rate, heat generating energy accumulated in the torque coupling is determined basically in correspondence with the load acting on the torque coupling. The heat generating energy is then accumulated. However, in this case, the accumulated heat generating energy, or the estimated temperature of the torque coupling, is cleared (deleted) once the engine, or the drive source, is stopped, or the ignition is turned off.

The temperature of the torque coupling, which rises when the engine operates, drops when the engine is held in a deactivated state. When the engine is re-started, or the ignition is turned on, estimation of the temperature of the torque coupling is resumed. If the temperature of the torque coupling has not decreased sufficiently in the engine deactivation period, there may be a difference between the actual temperature of the torque coupling and an initial value set for the temperature estimation.

Specifically, for example, if the time from deactivation of the engine to restarting of the engine is relatively short, the actual temperature of the torque coupling may remain relatively high when the engine is re-started, indicating necessity of suppression of overheating. However, in this case, the temperature of the torque coupling may be determined to be lower than the actual level. This may cause increased load to act on the torque coupling continuously, making it impossible to effectively protect the torque coupling.

SUMMARY OF THE INVENTION

Accordingly, it is an objective of the present invention to provide a drive force distribution device that suppresses overheating of a heat generating portion even immediately after re-starting of a drive source.

To achieve the foregoing objectives and in accordance with one aspect of the present invention, a drive force distribution device of a vehicle including a main drive wheel, a sub drive wheel, and a drive force transmission system that transmits a drive force generated by a drive source to the drive wheels is provided. The device includes a coupling, a control section, and a memory portion, and a timer portion. The coupling is arranged in the drive force transmission system. The coupling changes a torque transmission rate of a torque transmitted from an input of the coupling to an output of the coupling, thereby varying a drive force distribution ratio of the main drive wheel to the sub drive wheel. The control section controls operation of the coupling. The control section estimates the temperature of at least one of heat generating portions of the drive force transmission system by accumulating a heat generating energy accumulated in the heat generating portion in correspondence with the load acting on the heat generating portion. If the estimated temperature exceeds a predetermined temperature, the control section controls the operation of the coupling to reduce the load acting on the heat generating portion, thereby suppressing overheating of the heat generating portion. The memory portion memorizes the estimated temperature as a memorized temperature before the drive source is stopped. The timer portion measures the time since stopping of the drive source. The control section controls the operation of the coupling in correspondence with the time and the memorized temperature immediately after the drive source is re-started.

In accordance with a second aspect of the present invention, a method for distributing drive force of a vehicle including a main drive wheel, a sub drive wheel, and a drive force transmission system that transmits a drive force generated by a drive source to the drive wheels is provided. The method includes: transmitting a torque from an input of a coupling arranged in the drive force transmission system to an output of the coupling; varying a drive force distribution ratio of the main drive wheel to the sub drive wheel by changing a torque transmission rate of the coupling; estimating a temperature of at least one of heat generating portions of the drive force transmission system by accumulating a heat generating energy accumulated in the heat generating portion in correspondence with the load acting on the heat generating portion; determining whether the estimated temperature exceeds a predetermined temperature; controlling the operation of the coupling to reduce the load acting on the heat generating portion, thereby suppressing overheating of the heat generating portion if the estimated temperature of the heat generating portion exceeds the predetermined temperature; memorizing the estimated temperature as a memorized temperature before the drive source is stopped; measuring the time since the drive source is stopped; and controlling the operation of the coupling in correspondence with the time and the memorized temperature immediately after the drive source is re-started.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described with reference to the attached drawings.

Figure 1:
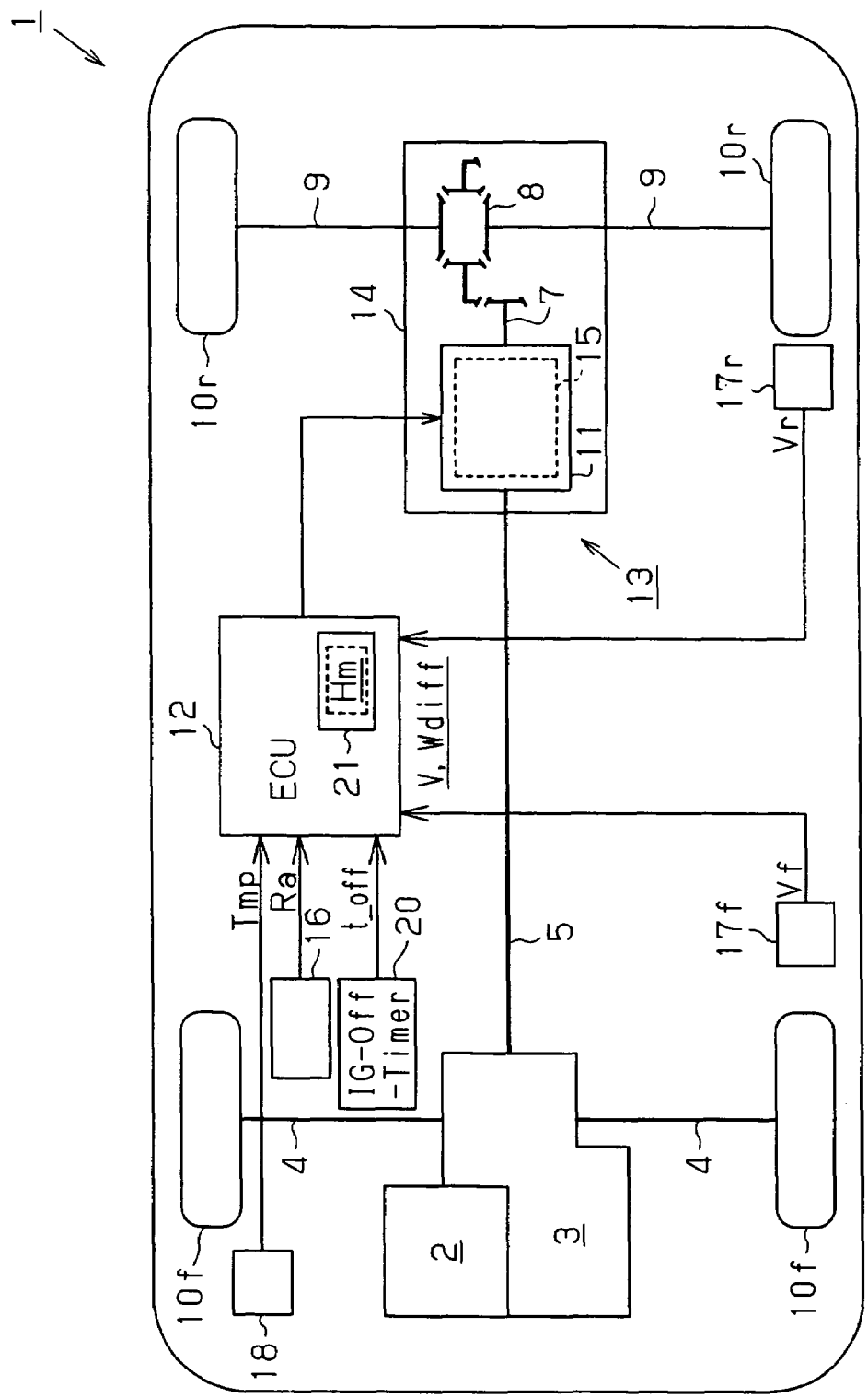
FIG. 1 is a diagram schematically showing a vehicle including a drive force distribution device according to one embodiment of the present invention.
Figure 2:
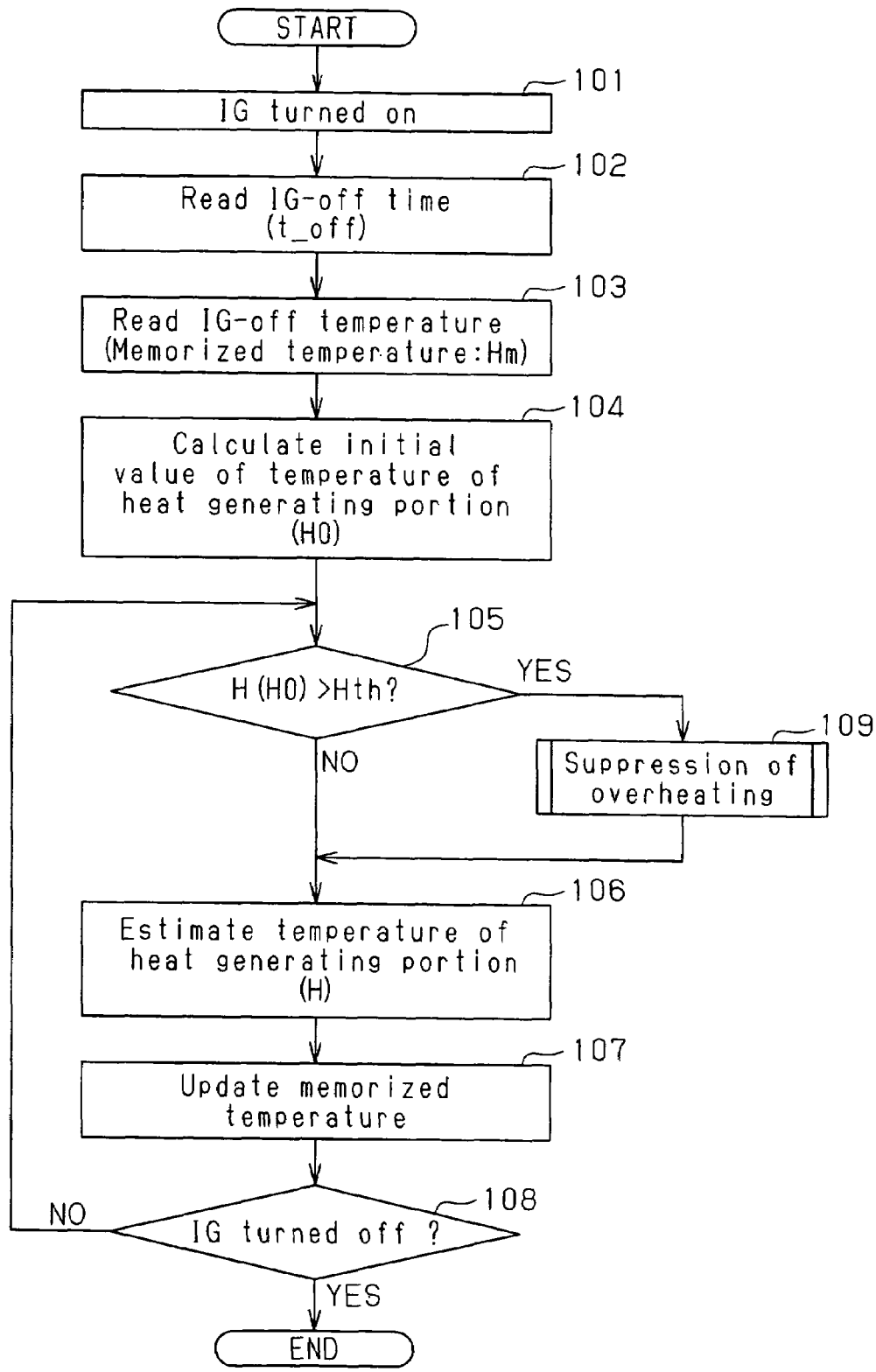
FIG. 2 is a flowchart representing a procedure for estimating the temperature of a heat generating portion of the drive force transmission system of the vehicle of FIG. 1 and a procedure for suppressing overheating of the heat generating portion.

As illustrated in FIG. 1, a vehicle 1 is a front-wheel-drive based four-wheel-drive vehicle. The present invention is embodied as a drive force distribution device of a four-wheel-drive vehicle. A transaxle 3 is provided in an engine 2. A pair of front axles 4 and a propeller shaft 5 are connected to the transaxle 3. The propeller shaft 5 is also connected to a drive pinion shaft 7. The pinion shaft 7 is connected to a pair of rear axles 9 through a rear differential 8, or a differential. In other words, the drive force generated by the engine 2 is transmitted sequentially to the transaxle 3 and the front axle 4 in this order and then reaches front wheels 10f. Meanwhile, the drive force of the engine 2 is transmitted sequentially to the transaxle 3, the propeller shaft 5, the pinion shaft 7, the rear differential 8, and the rear axle 9 in this order and thus received by rear wheels 10r.

In the illustrated embodiment, the vehicle 1 includes a torque coupling 11 and an ECU 12. The torque coupling 11 is arranged in the above-described drive force transmission system. The torque coupling 11 changes the rate of the torque transmitted from the input to the outlet of the torque coupling 11 (the torque transmission rate). This alters the drive force distribution ratio of the front wheels 10f, which are main drive wheels, to the rear wheels 10r, or sub drive wheels. The ECU 12 functions as a control section that controls operation of the torque coupling 11. In the illustrated embodiment, the torque coupling 11 and the ECU 12 form a drive force distribution device 13.

Specifically, the torque coupling 11 of the illustrated embodiment is arranged between the propeller shaft 5 and the pinion shaft 7. That is, the rear differential 8, or the differential, is provided between the torque coupling 11 and the rear wheels 10r, the sub drive wheels. The transaxle 3 includes a transfer case portion, which is arranged between the engine 2, or a drive source, and the torque coupling 11. The torque coupling 11, the pinion shaft 7, and the rear differential 8 are accommodated in a differential carrier 14.

In the present embodiment, the torque coupling 11 has an electromagnetic clutch 15. The electromagnetic clutch 15 has a pair of clutch plates, or an input clutch plate and an output clutch plate, and an electromagnetic coil. The input clutch plate is connected to the propeller shaft 5 and the output clutch plate is connected to the pinion shaft 7. The force generated by friction engagement between the clutch plates changes in correspondence with the amount of the current supplied to the electromagnetic coil. The torque is caused in correspondence with the friction engagement force of the clutch plates. The electromagnetic clutch 15 transmits the torque from the input clutch plate to the outlet clutch plate. By adjusting the amount of the current supplied to the electromagnetic clutch 15, the ECU 12 controls operation of the torque coupling 11, or regulates the torque transmission rate. In this manner, the ECU 12 adjusts the drive force distribution ratio of the front wheels 10f, or the main drive wheels, to the rear wheels 10r, or the sub drive wheels.

More specifically, in the illustrated embodiment, a throttle opening degree sensor 16 and wheel speed sensors 17f, 17r are connected to the ECU 12. In correspondence with signals provided by these sensors, the ECU 12 detects a throttle opening degree Ra, a vehicle speed V, and a wheel speed difference Wdiff, which is a difference between the wheel speed of each front wheel 10f and the wheel speed of each rear wheel 10r. The drive force distribution ratio is determined in correspondence with the detection results. The ECU 12 controls operation of the torque coupling 11 in such a manner as to adjust the torque transmission rate to a value corresponding to the determined drive force distribution ratio.

(Suppression of Overheating)

Next, suppression of overheating by the drive force distribution device of the illustrated embodiment will be explained.

The transaxle 3, the rear differential 8, and the torque coupling 11 are each a heat generating portion of the drive force transmission system. The drive force distribution device 13 suppresses overheating of the heat generating portions. If the temperature H of any of the heat generating portions exceeds the corresponding predetermined temperature Hth, operation of the torque coupling 11 is controlled to decrease the load acting on the heat generating portion. This suppresses overheating of the heat generating portion. Although the temperatures of the heat generating portions (3, 8, 11) are estimated separately, the temperatures of the heat generating portions are referred to commonly as the "temperature H". Similarly, although the predetermined temperature is set independently for each of the heat generating portions (3, 8, 11), the values are referred to commonly as the "predetermined temperature Hth".

Specifically, in the illustrated embodiment, the wheel speed sensors 17f, 17r and an outside temperature sensor 18 are connected to the ECU 12. In correspondence with the rotational speed (the differential rotational speed) of each of the heat generating portions, the torque transmission rate of the torque coupling 11, and the outside temperature Tmp detected by the outside temperature sensor 18, the ECU 12 estimates the temperatures H. The outside temperature sensor 18 is a temperature sensor arranged in the vicinity of an outside air inlet for the air conditioning of the passenger compartment or an intake air temperature sensor installed in an intake pipe of the engine.

Specifically, the ECU 12 calculates the heat generating energy accumulated in each of the heat generating portions in correspondence with the rotational speed of the heat generating portion and the transmitted torque. The heat generating energy is then accumulated. By reflecting cooling effect by the outside temperature Tmp in the accumulation result, the ECU 12 estimates the temperature H of the heat generating portion. More specifically, such computation by the ECU 12 involves an equation based on the equation (1), or an equation obtained by adding a cooling term that includes the outside temperature Tmp as a variable to the equation (1). In this manner, the temperature H of each of the heat generating portions (3, 8, 11) is estimated.

$$H(n)=K1\times\Sigma(K2\times\text{Transmitted Torque}\times\text{Rotational Speed}-K3\times H(n-1)) \quad (1)$$

In the equation (1), H(n−1) corresponds to a value obtained in a previous calculation cycle. K1, K2, and K3 are constants. By setting the constants K1, K2, K3 in correspondence with each of the heat generating portions (3, 8, 11), the estimated temperatures H of the heat generating portions are obtained independently. The "rotational speed" is calculated from the front wheel speed Vf detected by the wheel speed sensor 17f and the rear wheel speed Vr detected by the wheel speed sensor 17r. The transaxle 3 is arranged between the engine 2, or the drive source, and the front wheels 10f, or the main drive wheels and between the engine 2 and the torque coupling 11. Thus, the rotational speed of the transaxle 3 is determined in correspondence with the front wheel speed Vf. Since the rear differential 8 is arranged between the torque coupling 11 and the rear wheels 10r, or the sub drive wheels, the rotational speed of the rear differential 8 is determined in correspondence with the rear wheel speed Vr. The rotational speed (the differential rotational speed) of the torque coupling 11 is obtained from the difference between the front wheel speed Vf and the rear wheel speed Vr.

The ECU 12 determines whether the estimated temperature H of each heat generating portion exceeds the respective predetermined temperature Hth. If the determination is positive, the ECU 12 controls operation of the torque coupling 11 to reduce the load acting on the heat generating portion. This suppresses overheating of the heat generating portion.

Specifically, if the temperature of at least one of the rear differential 8 and the transaxle 3 becomes relatively high, the ECU 12 controls the operation of the torque coupling 11 to reduce the torque transmission rate. That is, heat generation in the transaxle 3 and the rear differential 8 becomes significantly great when the drive force is distributed dominantly to the rear wheels 10r, or the sub drive wheels. Thus, by decreasing the torque transmission rate of the torque coupling 11 and reducing the load applied to the transaxle 3 and the rear differential 8, overheating of the transaxle 3 and the rear differential 8 can be suppressed. In the illustrated embodiment, such overheating suppression is performed by changing a map by which the torque transmission rate is determined. That is, a normal map by which the drive force distribution ratio of the front wheels 10f to the rear wheels 10r is determined is switched to an overheating suppression map that sets the torque transmission rate to lower values.

Further, if the temperature of the torque coupling 11 becomes relatively high, the ECU 12 controls the operation of the torque coupling 11 to maximize the torque transmission rate. If, in addition to this condition, the temperature of at least one of the transaxle 3 and the rear differential 8 becomes relatively high, the ECU 12 controls the operation of the torque coupling 11 to minimize the torque transmission rate. Specifically, by maximizing the torque transmission rate, the torque coupling 11 is fully engaged and the differential rotational speed of the torque coupling 11 becomes substantially zero. This suppresses generation of friction heat and thus effectively prevents overheating of the torque coupling 11. Further, by minimizing the torque transmission rate, the drive force distributed to the rear wheels 10r becomes substantially zero. The torque coupling 11 is thus disengaged. This suppresses heat generation caused by friction of the torque coupling 11, minimizing the load acting on the transaxle 3 and the rear differential 8.

(Temperature Estimation after Re-starting of Engine)

Immediately after the engine 2 is re-started, the drive force distribution device 13 of the illustrated embodiment resumes the above-described temperature estimation in the following manner.

As illustrated in FIG. 1, the drive force distribution device 13 of the illustrated embodiment includes an IG-off-timer 20. The IG-off-timer 20 measures the time t_off since the engine 2 is stopped (the ignition is turned off). The ECU 12 sequentially memorizes the estimated temperature H of each of the heat generating portions (3, 8, 11) as a memorized temperature Hm. When the engine 2 is re-started, the memorized temperature Hm of each heat generating portion (3, 8, 11) represents the temperature of the heat generating portion before the engine 2 has been stopped. At this stage, the ECU 12 estimates the temperature H of each heat generating portion in correspondence with an initial value H0. Specifically, the initial value H0 is set in such a manner as to reflect a temperature drop of the heat generating portion in the engine deactivation period, or a temperature drop of the heat generating portion from the memorized temperature Hm. Although the temperatures are sequentially memorized independently for each of the heat generating portions (3, 8, 11), the memorized temperatures of the heat generating portions are referred to commonly as the "memorized temperatures Hm", like the "temperatures H" and the "predetermined temperatures Hth".

Specifically, with reference to the flowchart of *Fig.* 2, the engine 2, or the drive source, is started, or the ignition is turned on (in step 101). The ECU 12 then reads out the time t_off, which has been measured since stopping of the engine 2, or off-turning of the ignition, from the IG-off-timer 20 (in step 102). Subsequently, the ECU 12 reads out the memorized temperature Hm of each heat generating portion (in step 103). The memorized temperature Hm of each heat generating portion corresponds to the temperature of the heat generating portion estimated immediately before the ignition has been turned off. Then, the ECU 12 calculates the initial value H0 of each heat generating portion in correspondence with the time t_off and the memorized temperature Hm, which have been obtained in steps 101 and 102 (in step 104). Accordingly, the initial value H0 is set in such a manner as to reflect the temperature drop of each heat generating portion (3, 8, 11) in the deactivation period of the engine 2.

The equation by which the initial value H0 of the temperature H of each heat generating portion is obtained includes the equation (1) for obtaining the estimated temperature H, which is the base of the equation, and the cooling term added to the equation (1). The cooling item includes the outside temperature Tmp as a variable. Using this equation commonly, the ECU 12 calculates the initial values H0 of the heat generating portions (3, 8, 11) while taking into consideration the temperature drops of the heat generating portions in the time t_off. Thus, the initial value H0 of each heat generating portion (3, 8, 11) is determined in such a manner as to reflect the temperature drop of the heat generating portion caused by the influence by the outside temperature Tmp.

Next, the ECU 12 determines whether the temperature H of each heat generating portion exceeds the respective predetermined temperature Hth (in step 105). The temperature H corresponds to the initial value H0, which has been calculated in step 104. That is, the ECU 12 performs a pass/fail determination whether the initial value H0 of each heat generating portion exceeds the respective predetermined temperature Hth. If the temperature H (the initial value H0) of the heat generating portion is not greater than the predetermined temperature Hth (H≦Hth (H0≦Hth), NO in step 105), the ECU 12 estimates the temperature of the heat generating portion (in step 106). In correspondence with the thus obtained estimated temperature H, the memorized temperature Hm is updated (in step 107). In the illustrated embodiment, the ECU 12 has a non-volatile memory 21 (see FIG. 1). In step 107, the temperature H of each heat generating portion that has been estimated in step 106 is sequentially memorized in a memory 21, or a memory portion.

Subsequently, the ECU 12 determines whether the engine 2 has been stopped, or the ignition has been turned off (in step 108). If the determination is negative (NO in step 108), the ECU 12 repeats the pass/fail determination of step 105. If the temperature H of each heat generating portion that has been estimated in step 106 (or the initial value H0 that has been calculated in step 104) exceeds the predetermined temperature Hth (H>Hth (H0>Hth), YES in step 105), the above-described overheating suppression is carried out (in step 109).

The illustrated embodiment has the following advantages.

If the temperature of each heat generating portion (3, 8, 11) is estimated simply by accumulating the heat generating energy of the heat generating portion, the estimated temperatures H are cleared when the engine 2, or the drive source, is stopped, or the ignition is turned off. This may cause a difference between the initial value for estimation of the temperature of each heat generating portion and the actual temperature of the heat generating portion when the engine 2 is re-started. Thus, the temperature of each heat generating portion (3, 8, 11) may be underestimated even if the actual temperature of the heat generating portion is relatively high, indicating necessity of overheating suppression. In this case, increased load may continuously act on the heat generating portion.

However, the drive force distribution device 13 of the illustrated embodiment has the IG-off-timer 20 that measures the time t_off since the engine 2 is stopped, or the ignition is turned off. The ECU 12 sequentially stores the estimated temperature H of each heat generating portion as the memorized temperature Hm. The initial value H0, in correspondence with which the temperature H of each heat generating portion (3, 8, 11) is estimated immediately after the engine 2 is re-started, reflects the temperature drop of the heat generating portion that has been caused since stopping of the engine 2. In other words, the initial value H0 reflects the temperature drop of each heat generating portion from the memorized temperature Hm, which has been stored before stopping of the engine 2.

Therefore, the initial value H0 for resuming estimation of the temperature of each heat generating portion immediately after the engine 2 is re-started coincides with the actual temperature H of the heat generating portion. The temperature of each heat generating portion (3, 8, 11) is thus accurately estimated even immediately after the engine 2 is re-started. Accordingly, even if the actual temperature of the heat generating portion is relatively high, indicating necessity of overheating suppression, underestimation of such temperature is prevented. This prevents the heat generating portion from continuously receiving increased load. Further, overestimation of the temperature of each heat generating portion, or estimation of the temperature of the heat generating portion to be higher than the actual value, is suppressed. This prevents unnecessary overheating suppression. As a result, the heat generating portions are protected further appropriately.

It should be apparent to those skilled in the art that the present invention may be embodied in many other specific forms without departing from the spirit or scope of the invention. Particularly, it should be understood that the invention may be embodied in the following forms.

In the illustrated embodiment, the present invention is embodied as the drive force distribution device 13 of the vehicle 1 in which the front wheels 10f are the main drive wheels. However, the invention may be applied to a drive force distribution device of a vehicle in which the rear wheels 10r are the main drive wheels. Alternatively, the invention may be applied to a four-wheel drive device including a center differential device combined with an ECU or a device for distributing torque between front and rear wheels and/or right and left wheels.

In the illustrated embodiment, the transaxle 3, the rear differential 8, and the torque coupling 11 correspond to the heat generating portions of the drive force transmission system. However, only at least one of the transaxle 3, the rear differential 8, and the torque coupling 11 may be defined as a heat generating portion, which is a target of suppression of overheating.

Although the drive source of the vehicle 1 is the engine 2 in the illustrated embodiment, the drive source may be an electric motor other than an internal combustion engine.

In the illustrated embodiment, the equation for obtaining the initial value H0 includes the equation (1) by which the estimated temperature H is obtained, or the base of the equation, and the cooling term added to the equation (1). The cooling term includes the outside temperature Tmp as a variable. Using this equation commonly, the ECU 12 computes the initial values H0 of the heat generating portions (3, 8, 11) while taking into consideration the temperature drops of the heat generating portions in the time t_off. However, alternatively, the initial value H0 may be determined with reference to a map in which the initial value H0, the memorized temperature Hm, the outside temperature Tmp, and the time t_off are mutually related. Also, a theoretical temperature of each heat generating portion may be obtained using the equation (1). The theoretical temperature is then corrected by a correction value set in correspondence with the outside temperature Tmp, thus obtaining the estimated temperature H of the heat generating portion.

In the illustrated embodiment, the outside temperature Tmp is employed as a parameter for determining the estimated temperature H and the initial value H0. However, the outside temperature Tmp does not necessarily have to be employed as the parameter, as long as the estimated temperature H of each heat generating portion is determined by accumulating the heat generating energy accumulated in the heat generating portion in correspondence with the load acting on the heat generating portion. That is, the estimated temperature H may be obtained solely based on the rotational speed of the heat generating portion and the torque transmission rate. Alternatively, instead of the outside temperature Tmp, the temperature of the fluid supplied to each heat generating portion may be employed as a parameter.

In the illustrated embodiment, the initial value H0 of the estimated temperature H of each heat generating portion, which is determined immediately after the engine 2 is re-started, reflects the temperature drop of the heat generating portion in the deactivation period of the drive source (the engine 2). However, following re-starting of the engine 2, the ECU 12 may perform overheating suppression to reduce the load acting on the heat generating portion if the memorized temperature Hm of the heat generating portion is higher than the predetermined temperature and the time t_off since stopping of the drive source is shorter than a predetermined level.

Therefore, the present examples and embodiments are to be considered as illustrative and not restrictive and the invention is not to be limited to the details given herein, but may be modified within the scope and equivalence of the appended claims.

What is claimed is:

1. A drive force distribution device of a vehicle including a main drive wheel, a sub drive wheel, and a drive force transmission system that transmits a drive force generated by a drive source to the drive wheels, the device comprising:
a coupling arranged in the drive force transmission system, wherein the coupling changes a torque transmission rate of a torque transmitted from an input of the coupling to an output of the coupling, thereby varying a drive force distribution ratio of the main drive wheel to the sub drive wheel;
a control section that controls operation of the coupling, the control section estimating the temperature of at least one of heat generating portions of the drive force transmission system by accumulating a heat generating energy accumulated in the heat generating portion in correspondence with the load acting on the heat generating portion, wherein, if the estimated temperature exceeds a predetermined temperature, the control section controls the operation of the coupling to reduce the load acting on the heat generating portion, thereby suppressing overheating of the heat generating portion;
a memory portion that memorizes the estimated temperature as a memorized temperature before the drive source is stopped; and
a timer portion that, upon re-start of the drive source after the drive source is stopped, measures the time since the stopping of the drive source,
wherein the control section controls the operation of the coupling in correspondence with the measured time and the memorized temperature immediately after the drive source is re-started.

2. The device according to claim 1, wherein:
the control section sets an initial value of the estimated temperature immediately after the drive source is re-started; and
the initial value is set in correspondence with the time and the memorized temperature in such a manner that the initial value reflects a temperature drop of the heat generating portion in a deactivation period of the drive source.

3. The device according to claim 1, wherein:
the control section sets the initial value of the estimated temperature immediately after the drive source is re-started; and
the initial value is set in such a manner that the initial value reflects a temperature drop of the heat generating portion corresponding to the outside temperature.

4. The device according to claim 1, wherein:
if the memorized temperature is higher than the predetermined temperature and the time is shorter than a predetermined time since stopping of the drive source, the control section controls the operation of the coupling to reduce the load acting on the heat generating portion, thereby suppressing overheating of the heat generating portion.

5. The device according to claim 1, wherein the heat generating portion includes at least one of:
the coupling;
a differential arranged between the coupling and the sub drive wheel; and
a transfer case provided between the drive source and the coupling and between the drive source and the main drive wheel.

6. A method for distributing drive force of a vehicle including a main drive wheel, a sub drive wheel, and a drive force transmission system that transmits a drive force generated by a drive source to the drive wheels, the method comprising:
transmitting a torque from an input of a coupling arranged in the drive force transmission system to an output of the coupling;
varying a drive force distribution ratio of the main drive wheel to the sub drive wheel by changing a torque transmission rate of the coupling;
estimating a temperature of at least one of heat generating portions of the drive force transmission system by accumulating a heat generating energy accumulated in the heat generating portion in correspondence with the load acting on the heat generating portion;
determining whether the estimated temperature exceeds a predetermined temperature;
controlling the operation of the coupling to reduce the load acting on the heat generating portion, thereby suppressing overheating of the heat generating portion if the estimated temperature of the heat generating portion exceeds the predetermined temperature;
memorizing the estimated temperature as a memorized temperature before the drive source is stopped;
after the drive source is re-started after the drive source is stopped, measuring the time since the drive source is stopped; and
controlling the operation of the coupling in correspondence with the measured time and the memorized temperature immediately after the drive source is re-started.

7. The method according to claim 6, further comprising:
setting an initial value of the estimated temperature immediately after the drive source is re-started, wherein the initial value is set in correspondence with the time and the memorized temperature in such a manner that the initial value reflects a temperature drop of the heat generating portion in a deactivation period of the drive source.

8. The method according to claim 6, further comprising:
setting the initial value of the estimated temperature immediately after the drive source is re-started, wherein the initial value is set in such a manner that the initial value reflects a temperature drop of the heat generating portion corresponding to the outside temperature.

9. The method according to claim 6, further comprising:
determining whether the memorized temperature is greater than the predetermined temperature and the time is shorter than a predetermined time since stopping of the drive source; and
controlling the operation of the coupling to reduce the load acting on the heat generating portion, thereby suppressing overheating of the heat generating portion, if the determination is positive.

10. The method according to claim 6, wherein the heat generating portion includes at least one of:
the coupling;
a differential arranged between the coupling and the sub drive wheel; and
a transfer case provided between the drive source and the coupling and between the drive source and the main drive wheel.

* * * * *